United States Patent [19]
L'Allier et al.

[11] Patent Number: 6,039,575
[45] Date of Patent: Mar. 21, 2000

[54] INTERACTIVE LEARNING SYSTEM WITH PRETEST

[75] Inventors: James J. L'Allier, Batavia; Sally H. Welsh, Naperville; Boyd W. Nielsen, Batavia; Kurt W. Miles; Ken L. Myers, both of Naperville; Stephen P. Henrie, Woodridge; Michael I. Norberg, Downers Grove; Laura I. Helliwell, Naperville, all of Ill.

[73] Assignee: National Education Corporation, Naperville, Ill.

[21] Appl. No.: 08/738,038

[22] Filed: Oct. 24, 1996

[51] Int. Cl.[7] ...................................................... G09B 7/00
[52] U.S. Cl. ........................ 434/323; 434/118; 434/322; 434/362
[58] Field of Search ............................ 434/118, 322–325, 434/337, 234, 350, 353–362, 365, 156, 169, 307 R; 382/165, 176, 295, 291, 204, 317; 706/927; 273/429–431; 707/506, 2, 104, 501; 463/9, 42; 704/1, 3, 276

[56] References Cited

U.S. PATENT DOCUMENTS

| | | | |
|---|---|---|---|
| 4,593,904 | 6/1986 | Graves | 434/323 X |
| 4,867,685 | 9/1989 | Brush et al. | 434/234 |
| 5,180,309 | 1/1993 | Egnor | 434/353 |
| 5,267,865 | 12/1993 | Lee et al. | |
| 5,302,132 | 4/1994 | Corder | 434/307 R X |
| 5,306,154 | 4/1994 | Ujita et al. | 434/323 X |
| 5,395,243 | 3/1995 | Lubin et al. | |
| 5,437,553 | 8/1995 | Collins et al. | |
| 5,446,891 | 8/1995 | Kaplan et al. | 707/2 |
| 5,489,213 | 2/1996 | Makipaa | |
| 5,597,311 | 1/1997 | Yanagida et al. | 434/362 X |
| 5,618,182 | 4/1997 | Thomas | |
| 5,692,906 | 12/1997 | Corder | 434/118 |
| 5,700,149 | 12/1997 | Johnson, III et al. | 434/322 |
| 5,749,736 | 5/1998 | Griswold et al. | 434/322 |
| 5,802,373 | 9/1998 | Yates et al. | 395/705 |

FOREIGN PATENT DOCUMENTS

| | | |
|---|---|---|
| 0 710 942 A2 | 5/1996 | European Pat. Off. |
| 0 710 943 A2 | 5/1996 | European Pat. Off. |

OTHER PUBLICATIONS

"Skill Builder 5.2", National Education Training Group, Inc., Jul. 1997, p. 1–25.

*Primary Examiner*—Joe H. Cheng
*Attorney, Agent, or Firm*—Allen, Dyer, Doppelt Milbrath & Gilchrist, P.A.

[57] ABSTRACT

A method of providing an automated learning sequence includes pretesting a user with at least one question from each of a plurality of learning objectives. The results of the evaluations of the pretesting process are used to produce a specific sequence of instructional units in response to those responses that varied materially from the respective standard. The sequence of instructional units is then presented to the user for interactive learning.

7 Claims, 5 Drawing Sheets

LEARNING OBJECT™ CONTENT:

CONTEXT
CONTENT
PRACTICE
OBJECTIVE
MASTERY TEST ITEM(S) (OPTIONAL)
BLOOM LEVEL
INSTRUCTIONAL STRATEGY
MOTIVATIONAL STRATEGY

— 150

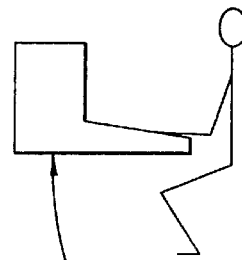

LEARNING OBJECT™ IMPLEMENTATION

| PAGE 1 | . . . | PAGE N |

PAGES ARE LINKED TO EACH OTHER BOTH LINEARLY AND NON-LINEARLY

PAGES CONTAIN:
   TEXT
   MULTIMEDIA COMPONENTS
   USER INTERACTION LOGIC

— 152

OBJECT ACCESS PROGRAM

156

LEARNING OBJECT™ GROUPED TOGETHER

LEARNING OBJECT™ 1 . . . LEARNING OBJECT™ N
LEARNING OBJECT™ 2

— 154

LEARNING OBJECT™'S ARE GROUPED TOGETHER BECAUSE THEY ARE EITHER RELATED OR ONE SERVES AS A PREREQUISITE FOR ANOTHER.

FIG. 5.

INTERACTIVE LEARNING SYSTEM WITH PRETEST

FIELD OF THE INVENTION

The invention pertains to interactive learning systems. More particularly, the invention pertains to computer based interactive learning systems which incorporate pre and post testing capabilities to evaluate the status and progress of a user.

BACKGROUND OF THE INVENTION

Computer based interactive learning systems are known. One particular example is described in U.S. Pat. No. 5,395,243 to Lubin et al. entitled Interactive Learning System and which is Assignee to the Assignee hereof. The specification and figures of the Lubin et al. Patent are incorporated herein by reference.

Lubin et al. describes a computer based interactive learning system wherein a user can be assisted in learning how to use a pre-written application program. Typical application programs include word processing or spread sheet operation or operating systems. Lubin et al. describes three different learning paths. One of the learning paths is a preset lesson path in which the user goes through a sequence of audio visual lessons relating to various predetermined features of the application program being studied. Upon completion of the lesson sequence, the user is then given an opportunity to work with the actual application program to reenforce the previously provided instruction.

In a second learning path, the user may independently select a topic relating to an aspect of the application program which is being studied. The user will then receive audio/visual lessons and/or electronically displayed material relating to that topic.

In a third learning path, the user is able to execute the application program without receiving any training of the type provided by Lubin's system. During this sequence however, the user may access various help files which can present electronic textual reference information relating to that application program while the program is running. This process can be carried out without having to exit the application program.

The above described types of learning paths have been found to be useful and effective for many users. Lubin's system, however, did not incorporate any capability to evaluate a user's level of skill prior to executing any of the learning paths. It would be desirable to be able to combine systems of the type taught by Lubin with a functional capability to take into account a user's initial level of skill, if any.

Thus, there continues to be a need for interactive learning systems which take into account a user's initial skill level. It would also be desirable, if a user were able to combine lesson elements to create an individualized learning experience apart from any pre-established learning paths.

SUMMARY OF THE INVENTION

In accordance with the invention, an interactive learning system and method are provided and can be used for learning a selected, pre-written program. In one aspect of the invention, a paperless, individualized, learning sequence can be developed and presented to the respective user for the purpose of improving a user's skill and understanding with respect to given subject matter.

An apparatus in accordance with the present invention incorporates a prestored, machine-readable database having a plurality of questions or exercises which are directed toward assessing the individuals understanding of a selected learning objective. Pluralities of questions are provided for each member of a plurality of different learning objectives.

The apparatus carries out an automatic evaluation of the individual by sequentially selecting from the database at least one of the questions or exercises associated with each member of the plurality of learning objectives. The selected question or exercise is displayed for the individual who in turn enters a response. Each of the responses that is received is evaluated relative to a predetermined standard before the next question is selected.

The system accumulates the responses and the results of the evaluations for subsequent processing.

The apparatus in turn produces from the results of the evaluations a sequence of instructional units, based on those responses which varied materially from the respective standard which are intended to improve the user's skills on an individualized basis. The sequence of instructional units can then be presented on a display, for example, for the individual. The individual can then progress through the sequence of units so as to improve selected skills in response to the prior evaluation.

In one aspect of the invention, subsequent to complete execution of the sequence of instructional units, the user can then go through a post-learning evaluation or test for comparison purposes.

In yet another aspect of the invention, a user can select from among a number of object elements to independently create a personalized learning experience. At a first level, topic-type object elements can be selected which contain, for example, a single objective and an assessment capability. At a higher level, lesson-type object elements can be selected. The lesson-type object elements incorporate a plurality of related topic-type object elements. In another aspect of the invention, at yet another level, unit-type object elements can be selected. The unit-type object elements incorporate a plurality of related lesson-type object elements.

In yet another aspect of the invention, learning-type objects can be grouped together and associated because they incorporate related subject matter or one functions as a prerequisite to another. Similarly, unit-type objects can in turn be associated with one another because they incorporate related subject or because some of them represent prerequisites for others.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWINGS

FIG. 5 is a flow diagram of a process of selecting learning objects for the creation of a personal learning experience.

DETAILED DESCRIPTION OF THE PREFERRED EMBODIMENTS

Figure 1:
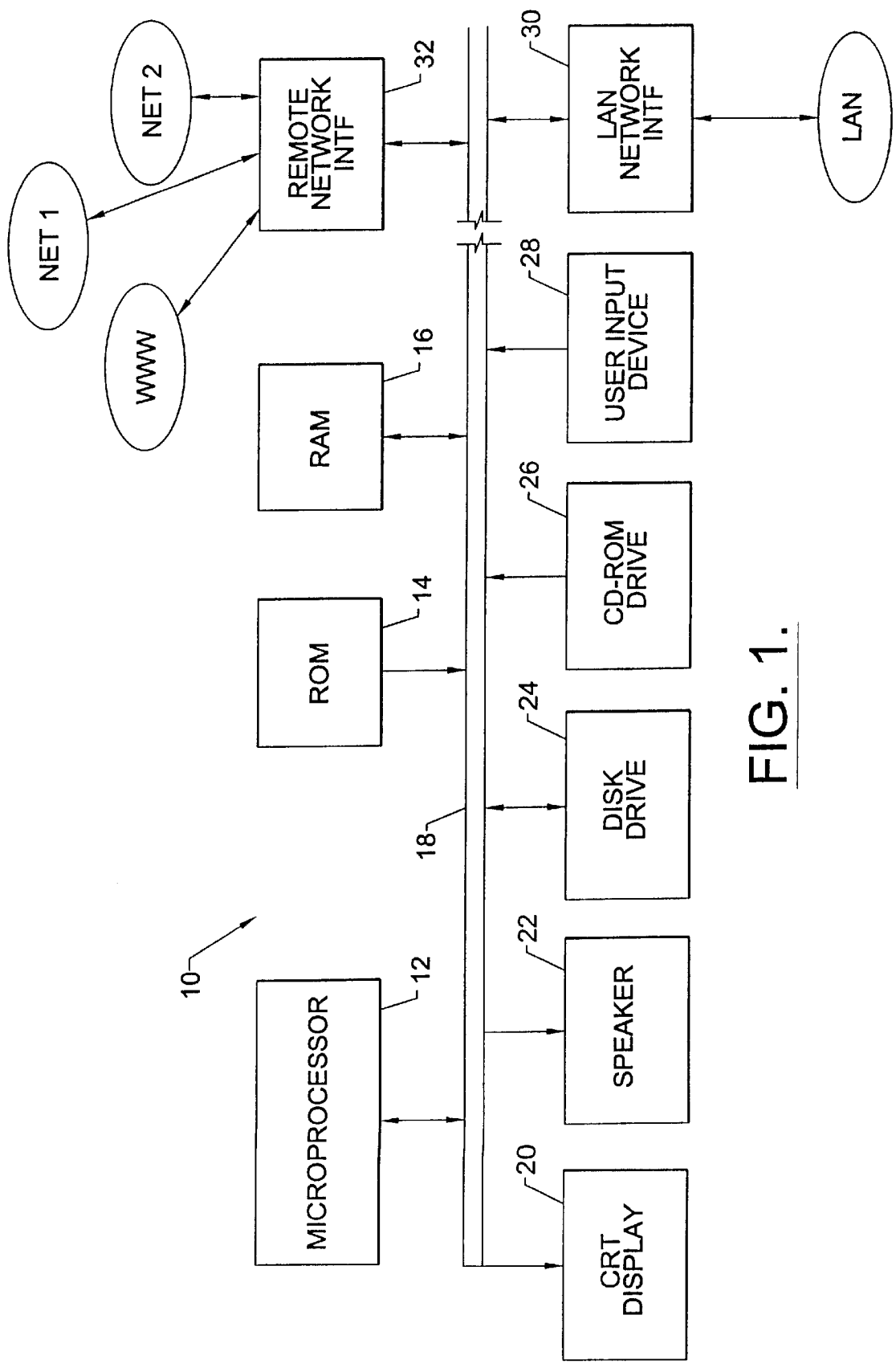
FIG. 1 is a block diagram of a system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates an interactive learning system 10 which incorporates a plurality of components. The system 10 includes a control unit 12, which could implemented as a microprocessor. Associated with the microprocessor 12 are read-only memory 14 and read-write memory 16 which communicate with the processor 12 via a bidirectional bus structure 18. The memories 14, 16, as is known in the art, can be used to permanently or temporarily store constants programs being executed, or related data.

Also coupled to the bus 18 is a monitor, such as a CRT-type display 20, loud speakers 22, magnetic disk drive 24, CD-Rom Drive 26 and a user input device 28. The user input device 28 could be a keyboard, it could alternately be a mouse.

In addition, a local area network (LAN) interface 30 enables the system 10 to communicate with the local network. Further, a remote network interface 32 provides bidirectional communication with the Worldwide Web or other remote networks either through telecommunications or through other forms of data transmission without limitation.

In normal operation, programs can be stored on and read from disk drive 24 or CD-Rom drive 26. Graphics can also be read from the CD-Rom drive.

Both the disk drive 24 and the CD-Rom drive 26 can be used as sources from which databases can be accessed.

During normal operation of the system 10, visual information in lessons can be displayed on the display unit 20, under control of the processor 12. Text and graphics can be read from disk drive 24 or CD-Rom drive 26 for the purpose of displaying same to the user. As will be discussed subsequently, a control program for the purpose of carrying out the interactive learning process can be stored on one or both of disk drive 24 or CD-Rom 26 for access by processor 12. Processor 12 is thus able to carry out a prestored process which provides for individual assessment of a user's skills prior to the user going through the interactive learning process.

Figure 2:
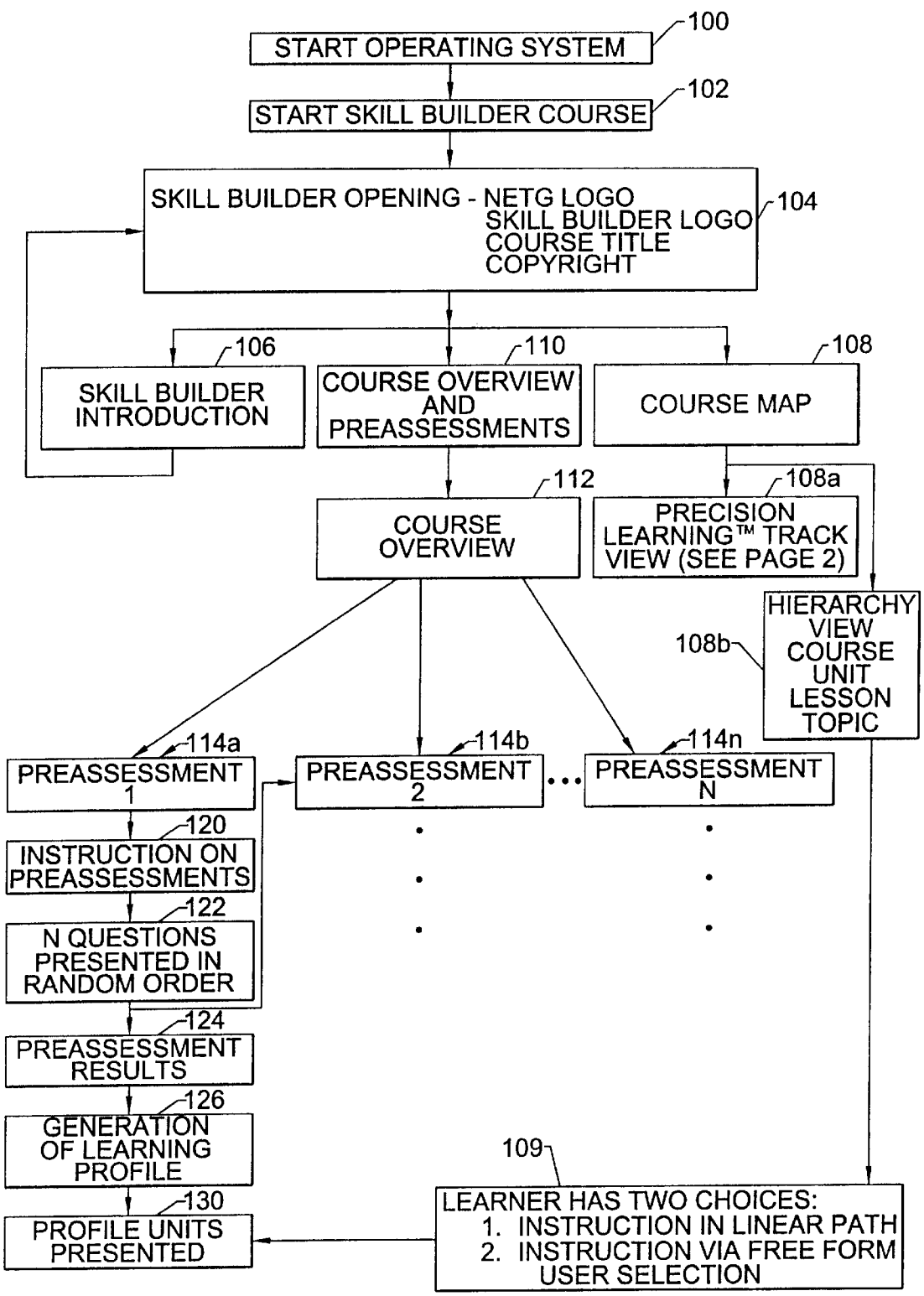
FIG. 2 is an overall flow diagram of the process of creating an individual learning profile.

FIG. 2 is a flow diagram illustrating various steps of a method in accordance with the present invention. In a step 100, the operating system for the system 10 is started. In a step 102 execution of the interactive learning system application program, of a type, for example described in Lubin but for use with an icon driven operating system such as available under the Trademark Windows 95 is started. In a step 104 the learning system carries out an initial sequence of displaying titles and related text. When the system exits the initiating step 104, the user can select an introduction in a step 106 or can elect to turn directly to the course associated with the system in a step 108, or in a step 110, a user can enter a course overview and pre-assessment testing sequence. After passing through a course overview in a step 112, the user enters the beginning of a plurality of pre-assessment sequences indicated generally at 114A, 114B . . . 114N. The steps of a selected pre-assessment sequence are similar so a description of the sequence 114a will also describe sequences 114B . . . 114N.

If the user wishes to skip the preassessment by proceeding directly to step 108, the Precision Learning Track view is displayed in step 108a or a hierarchy view of the course unit lesson topics is presented in step 108b which leads to a study of profile units.

In a step 120, instructions are presented on the display 20 for the user as to how to carry out the pre-assessment process. Subsequently, in a step 122 a plurality of questions or exercises are displayed, one at a time, in random order on the display 20. The user responds to each of the questions or exercises using the keyboard or mouse 28 and the responses are stored by the processor 12. In a step 124, the responses are compared to a pre-established standard, also stored in the disk drive 24 or the CD-Rom drive 26 to assess the performance of the user. For example and without limitation, if questions are presented to the user, they can be ranged so as to have right or wrong answers or to have more preferred vs. less preferred answers which can be in turn reflected in the pre-stored standard. The correlation between the answers received from the user during the step 122 and the appropriate or desirable answers as reflected in the prestored standard, provides a basis for establishing a quantitative assessment of user performance (step 124). Subsequent to the step 124, if an individualized learning profile is to be produced based on the sequence 114a, that profile is then produced in a step 126. Subsequent to the step 126, the learning units can be presented to the user in a step 130 discussed subsequently.

If desired, prior to generation of the individualized learning profile in the step 126, additional pre-assessment sequences 114B . . . 114N can be executed to provide a composite learning profile.

Figure 3:
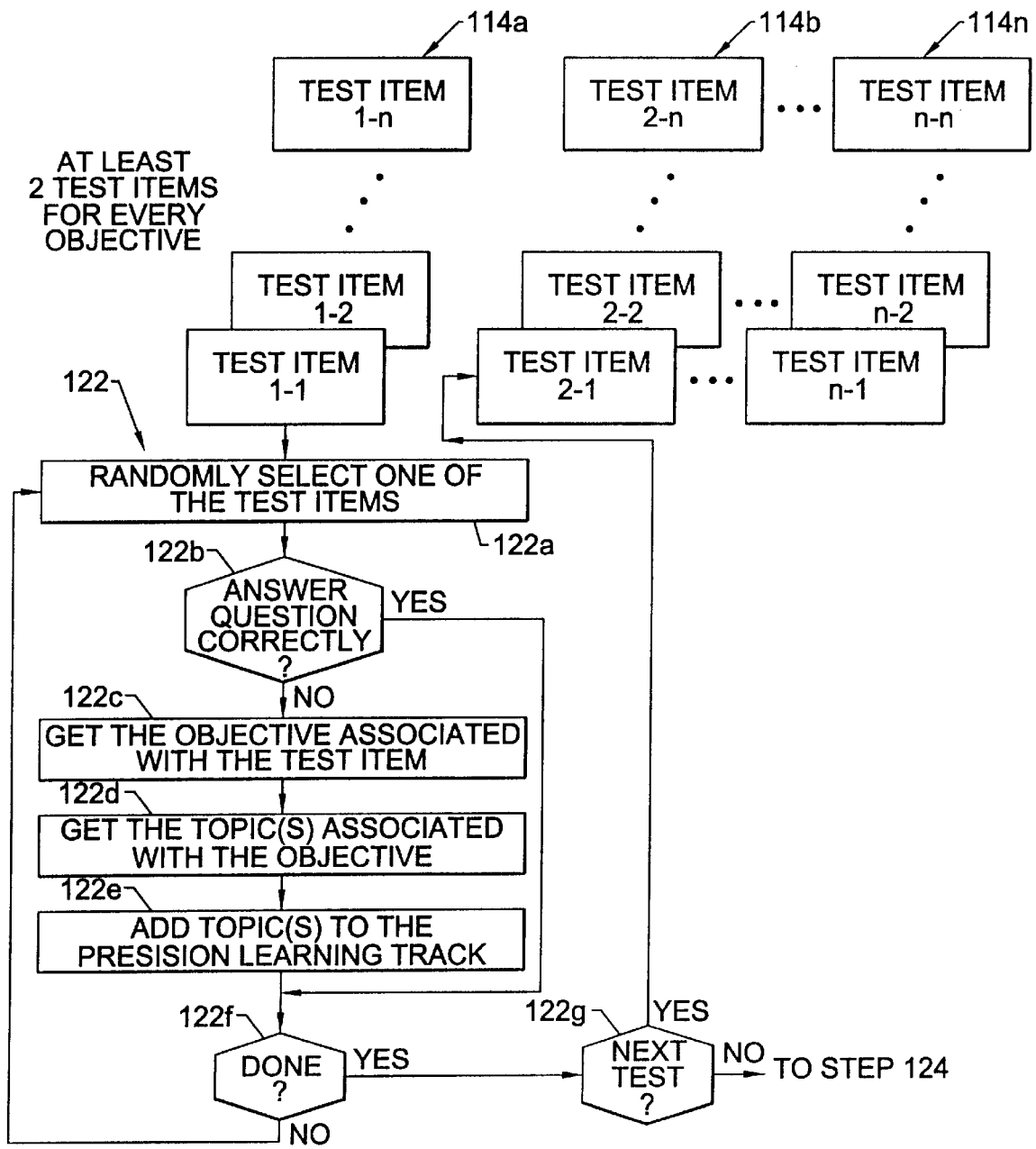
FIG. 3 is a more detailed flow diagram of one aspect of the process of FIG. 2.

FIG. 3 illustrates in more detail the generation of the individualized learning track as illustrated in the step 122. Test items 1-1 . . . 1-N to be presented in the step 122 are prestored in one of the disk drive 24 or CD-Rom drive 26. In the step 122, one of the test questions or exercises is selected and presented to the user on the display 20. The answer or response received via the input device 28 is compared to a previously stored answer and a step 122a. If the answer is unsatisfactory, the objective associated with the test item and the associated topic are retrieved in respective steps 122b, 122c. At least the associated topic is then added to the individual learning profile in a step 122d. If the answer is answered correctly in the step 122a, a determination is made in the step 122f if the testing sequence is finished. If it is not finished, the next test item selected. If the test sequence is finished, either (step 122g) the next text sequence 114b is entered or the user's performance is assessed in the step 124.

Examples of test items follow as Examples 1 and 2. Example 1 illustrates two different matching-type test items. Example 2 illustrates two different process educating test items.

EXAMPLE 1

Objective

Identify the Explorer features to view files and folders.
Related Topic(s):
  Changing the Display
  Expanding and Collapsing Folders
Test Item 1: (question type=matching)
Match the button to the kit performs:
  a:  Displays files as large icons
  b:  Displays file names in a list
  c:  Displays file information for each file
  d: + Opens a folder
  e:  Closes a folder
Test Item 2: (question type=matching)
  Match the feature to the desired outcome.

a: Arrange by Date Orders file names by last modification
b: Arrange by Size Lists file names according to their space requirements
c: Arrange by Type Displays all text documents
d: Plus Sign Displays the files in a folder
e: Minus Sign Closes an open folder containing files

EXAMPLE 2

Objective

Preview a file using Quick View on the sortcut menu.

Related Topic(s):

Quick View

Test Item 1: (question type=simulation)

Complete the steps to see a Quick View of REPORT1.DOC using the shortcut menu.

Test Item 2: (question type=simulation)

Complete the action to preview a Quick View of Agenda. doc using the shortcut menu.

Figure 4:
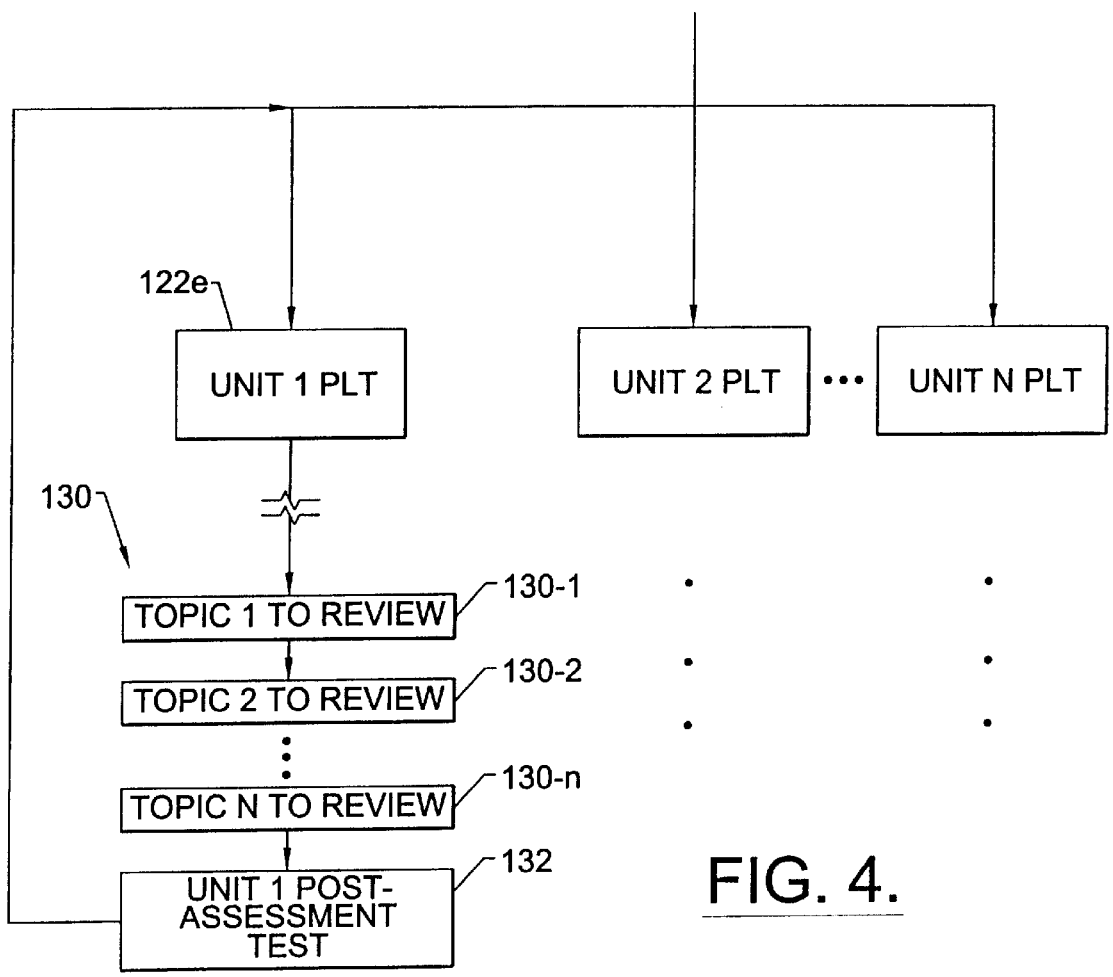
FIG. 4 is a more detailed flow diagram of another aspect of the process of FIG. 2.

FIG. 4 is a flow diagram illustrating in more detail executing the personal learning sequence, step 130. Where the personal learning sequence, created in the step 122d includes a plurality of topics $T_1 \ldots T_N$ the system 10 presents each of the selected topics in a series of steps 130-1 ... 130-N to the user via the display 20. The user can interact with the various presented topics via the keyboard or mouse 28 during the process of going through that particular individualized learning sequence. Subsequent to exiting the learning sequence, the system 10 can present a post-assessment test in a step 132 to determine the level of skill that the user has improved to as a result of the process. A similar set of steps can be carried out to implement the personal learning sequence for each of the units $U2 \ldots U_N$.

Hence, when completed, the user will have experienced an individualized learning sequence in connection with one or more of the units 1-N. The user can then exit to the step 109 and enter the application or other program being taught for direct execution or can enter additional course units for further instruction.

FIG. 5 illustrates an overall flow diagram for an alternate approach to creating a personalized learning experience based on collecting together a plurality of separately accessible learning objects. The learning objects are contained in an accessible database which is organized in several different ways, having both hierarchical and contact-sensitive aspects.

A course object is made up of a plurality of independently accessible unit objects. Unit objects are learning objects which include a plurality of independent lesson objects. Lesson objects, in turn, are also learning objects which are made up of a plurality of dependent topic objects. Topic objects are dependent objects which contain a single objective and an assessment.

The content of a learning object is illustrated, in an overall sense, in block 150 of FIG. 5.

The lesson object is the smallest independent instructional activity available to a user. A given lesson object exhibits internal cohesion and is focused about a plurality of dependent topic objects.

A lesson object incorporates a plurality of objectives as well as a second plurality of test or assessment items. It also incorporates predefined sequencing and interactions between related, dependent, topic objects.

Lesson objects can be linked with other lesson objects or can stand alone. Topic objects, by way of contrast, are dependent on the associated lesson object and contain only a single objective and an associated assessment.

As illustrated in block 152 of FIG. 5, learning objects can be implemented out of a plurality of linked pages. The pages can be linked together both linearaly and non-linearaly. Pages can contain text, multi-media components and user interaction logic.

Alternately, learning objects can be grouped together as a result of content or because one or more serves as a prerequisite for another, as illustrated in element 154 of FIG. 5.

A plurality of learning objects can be selected via a User through an object access program 156. The User can select, via the access program 156, one or more lesson objects to be experienced for the purpose of addressing an education or training objective. Learning objects can be stored on a variety of media such as magnetic disc drives and/or CD Rom drives. The object access program 156 can be accessed by the User not only directly through a local area network but also remotely via the Internet and the Worldwide Web, if desired.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A computer based method of automatically providing a paperless, individualized, learning sequence comprising:

storing in a computer readable database a plurality of questions directed toward assessing an individual's understanding of a selected learning objective for each member of a plurality of different learning objectives;

automatically evaluating the individual by randomly and sequentially selected from the database at least one question associated with each member of the plurality of learning objectives and displaying each selected question to the individual for a response wherein each response is received and evaluated relative to a predetermined standard before the next question is selected;

accumulating at least some of the results of the evaluations in a computer storage unit in computer readable form;

processing the results to automatically produce a specific sequence of instructional units in response to those responses which varied materially from the respective standard; and presenting the sequence of instructional units on a display for the individual wherein the individual can interact with each of the units via the display.

2. A method as in claim 1 wherein in storing step, at least some of the questions are linked to a plurality of possible answers and in the displaying step, at least the selected question and the plurality of possible answers are displayed.

3. A method as in claim 1 wherein in the storing step, some of the questions are stored in a form which directs the individual to achieve a specified result without specifying the actions to be taken.

4. A method as in claim 1 which includes presenting a performance evaluating test, subsequent to presenting the sequence of instructional units.

5. An apparatus for providing an automatic, paperless, individualized learning sequence to a user comprising:

a programmable processor;

a visual display coupled to the processor;

a unit coupled to the processor, for reading control information and a database from a medium and providing that information to the processor and wherein, in response to that information, the processor accesses the database and wherein the processor includes circuitry for randomly selecting from the database a plurality of assessment questions and circuitry for presenting the plurality of questions to the user on the display;

a user operable input device coupled to the processor, whereby the user provides responses to the processor to at least some of the assessment questions and wherein the processor includes further circuitry for evaluating the responses and in response thereto for establishing a sequence of selected topics for presentation to the user.

6. A system as in claim 5 wherein the processor includes further circuitry for presenting the sequence of selected topics to the user.

7. A system as in claim 6 wherein the processor includes further circuitry for reading from the database a post-test and circuitry for presenting the post test to the user.

* * * * *

(12) EX PARTE REEXAMINATION CERTIFICATE (5628th)
United States Patent
L'Allier et al.

(10) Number: US 6,039,575 C1
(45) Certificate Issued: Dec. 5, 2006

(54) INTERACTIVE LEARNING SYSTEM WITH PRETEST

(75) Inventors: James J. L'Allier, Batavia, IL (US); Sally H. Welsh, Naperville, IL (US); Boyd W. Nielsen, Batavia, IL (US); Kurt W. Miles, Naperville, IL (US); Ken L. Myers, Naperville, IL (US); Stephen P. Henrie, Woodridge, IL (US); Michael I. Norberg, Downers Grove, IL (US); Laura I. Helliwell, Naperville, IL (US)

(73) Assignee: National Education Training Group, Inc., Chestnut Hill, MA (US)

Reexamination Request:
No. 90/005,985, Apr. 17, 2001

Reexamination Certificate for:
Patent No.: 6,039,575
Issued: Mar. 21, 2000
Appl. No.: 08/738,038
Filed: Oct. 24, 1996

(51) Int. Cl.
*G09B 7/00* (2006.01)

(52) U.S. Cl. .................. 434/323; 434/118; 434/322; 434/362

(58) Field of Classification Search .......... 434/323, 434/118, 322, 362
See application file for complete search history.

(56) References Cited

U.S. PATENT DOCUMENTS

| | | | |
|---|---|---|---|
| 3,399,469 A | 9/1968 | Nisbet | |
| 3,453,753 A | 7/1969 | Farnum | |
| 3,641,685 A | 2/1972 | Zawels et al. | |
| 3,999,307 A | 12/1976 | Tsuda et al. | |
| 4,586,905 A | 5/1986 | Groff | |
| 4,593,904 A | 6/1986 | Graves | |
| 4,611,996 A | 9/1986 | Stoner | |
| 4,622,013 A | 11/1986 | Cerchio | |
| 4,671,772 A | 6/1987 | Slade et al. | |
| 4,798,543 A | 1/1989 | Spiece | |
| 4,867,685 A | 9/1989 | Brush et al. | |
| 4,895,518 A | 1/1990 | Arnold et al. | |
| 4,968,257 A | 11/1990 | Yalen | |
| 5,002,491 A | 3/1991 | Abrahamson et al. | |
| 5,035,625 A | 7/1991 | Munson et al. | |
| 5,065,345 A | 11/1991 | Knowles et al. | |
| 5,084,819 A | 1/1992 | Dewey et al. | |
| 5,100,329 A | 3/1992 | Deesen et al. | |
| 5,103,408 A | 4/1992 | Greenberg et al. | |
| 5,103,498 A | 4/1992 | Lanier et al. | |

(Continued)

FOREIGN PATENT DOCUMENTS

| | | |
|---|---|---|
| EP | 0 710 942 | 5/1996 |
| EP | 0 710 943 | 5/1996 |
| FR | 2697365 A1 | 4/1994 |
| JP | 406149145 A | 5/1994 |
| WO | WO 90/05350 | 5/1990 |
| WO | WO 94/19785 | 9/1994 |

OTHER PUBLICATIONS

Unknown Author, "Industry Education Computer Based Training Strategy Data Base Learning Model," Mar. 1998, Industry Education.*

(Continued)

*Primary Examiner*—John E. Rovnak

(57) ABSTRACT

A method of providing an automated learning sequence includes pretesting a user with at least one question from each of a plurality of learning objectives. The results of the evaluations of the pretesting process are used to produce a specific sequence of instructional units in response to those responses that varied materially from the respective standard. The sequence of instructional units is then presented to the user for interactive learning.

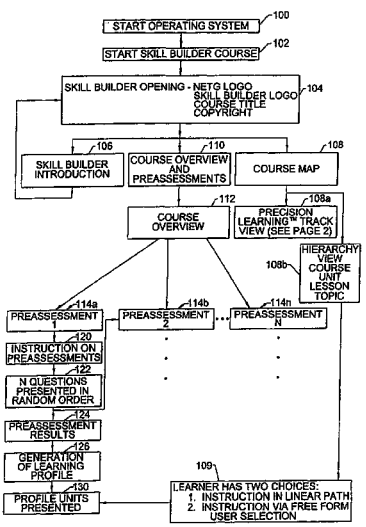

U.S. PATENT DOCUMENTS

| | | |
|---|---|---|
| 5,115,501 A | 5/1992 | Kerr |
| 5,180,309 A | 1/1993 | Egnor |
| 5,204,813 A | 4/1993 | Samph et al. |
| 5,204,968 A | 4/1993 | Parthasarathi |
| 5,211,563 A | 5/1993 | Haga et al. |
| 5,241,671 A | 8/1993 | Reed et al. |
| 5,259,766 A | 11/1993 | Sack et al. |
| 5,261,823 A | 11/1993 | Kurokawa |
| 5,267,865 A | 12/1993 | Lee et al. |
| 5,302,132 A | 4/1994 | Corder |
| 5,306,154 A | 4/1994 | Ujita et al. |
| 5,308,244 A | 5/1994 | Hirose |
| 5,310,349 A | 5/1994 | Daniels et al. |
| 5,316,485 A | 5/1994 | Hirose |
| 5,326,270 A | 7/1994 | Ostby et al. |
| 5,344,324 A | 9/1994 | O'Donnell et al. |
| 5,344,326 A | 9/1994 | Ferris |
| 5,372,507 A | 12/1994 | Goleh |
| 5,395,243 A | 3/1995 | Lubin et al. |
| 5,421,730 A | 6/1995 | Lasker, III et al. |
| 5,421,731 A | 6/1995 | Walker |
| 5,437,553 A | 8/1995 | Collins et al. |
| 5,437,554 A | 8/1995 | Clark et al. |
| 5,437,555 A | 8/1995 | Ziv-El |
| 5,441,415 A | 8/1995 | Lee et al. |
| 5,442,759 A | 8/1995 | Chiang et al. |
| 5,446,891 A | 8/1995 | Kaplan et al. |
| 5,458,493 A | 10/1995 | Clark et al. |
| 5,489,213 A | 2/1996 | Makipaa |
| 5,496,175 A | 3/1996 | Oyama et al. |
| 5,535,422 A | 7/1996 | Chiang et al. |
| 5,537,618 A | 7/1996 | Boulton et al. |
| 5,545,044 A | 8/1996 | Collins et al. |
| 5,566,291 A | 10/1996 | Boulton et al. |
| 5,576,844 A | 11/1996 | Anderson et al. |
| 5,590,057 A | 12/1996 | Fletcher et al. |
| 5,594,311 A | 1/1997 | Yasuda et al. |
| 5,597,312 A | 1/1997 | Bloom et al. |
| 5,602,982 A | 2/1997 | Judd et al. |
| 5,618,182 A | 4/1997 | Thomas |
| 5,627,958 A | 5/1997 | Potts et al. |
| 5,658,161 A | 8/1997 | Roberts et al. |
| 5,680,617 A | 10/1997 | Gough et al. |
| 5,690,497 A | 11/1997 | Clark et al. |
| 5,692,906 A | 12/1997 | Corder |
| 5,700,149 A | 12/1997 | Johnson, III et al. |
| 5,721,845 A | 2/1998 | James et al. |
| 5,727,950 A | 3/1998 | Cook et al. |
| 5,749,736 A | 5/1998 | Griswold et al. |
| 5,788,508 A | 8/1998 | Lee et al. |
| 5,802,373 A | 9/1998 | Yates |
| RE36,028 E | 1/1999 | Deesen et al. |
| 6,186,794 B1 * | 2/2001 | Brown et al. ............... 434/116 |
| 6,206,700 B1 * | 3/2001 | Brown et al. ............... 434/116 |

OTHER PUBLICATIONS

Verl E. Dennis and Dennis Gruner, "Computer Managed Instruction at Arthur Andersen & Company: A Status Report," Educational Technology, Mar. 1992, pp. 7–16.

James J. L'Allier, Kurt W. Miles, and Sally H. Welsh, "The NETg® Mastery Test Strategy," published as a white paper on the NETg internet web site on Apr. 12, 1995, pp. 1–12.

James J. L'Allier, "A Frame of Reference: NETg's Map to Its Products, Their Structures and Core Beliefs," Discussion Paper Series, May 1997.

Dorman Woodall, "Instructional Principles For Adult Learners: Learning by Design," NETg, 1998.

John McDonald, Jane Stenger, "The Effects of Hypothesis on the Use of Positive and Diagnostic Test Strategies," Organizational Behavior & Human Decision Processes, vol. 56 No. 2, Nov. 1993, pp. 213–232.

David Edmund Scott, "Visual Diagnostic Skill Development and College Students' Acquisition of Basic Conducting Skills," Journal of Research in Music Education, vol. 44 (Fall 1996) pp. 229–239.

Erin D. Bigler, "Brain Imaging and Behavioral Outcome in Traumatic Brain Injury," Journal of Learning Disabilities vol. 29 ( Sep. 1996) pp. 515–530.

Ronald P. Carver, Susan W. Clark, "Investigating reading disabilities using the rauding diagnostic system," Journal of Learning Disabilities, vol. 31, No. 5, (Sep./Oct. 1998), pp. 453–471.

Janet Malone, "Driving good instruction. impact of class size reduction on student achievements in Poway Unified School District," Thrust for Educational Leadership, vol. 27, (Jan. 1998), pp. 33–35.

Robert C. Panell, Gerald J. Laabs, "Construction of a Criterion–Referenced, Diagnostic Test for an Individualized Instruction Program," Journal of Applied Psychology, vol. 64, No. 3, (Jun. 1979) pp. 255–261.

John McDonald, "The Relative Effectiveness of Diagnostic and Positive Test Strategies is Logically Indeterminable," The Psychological Record, vol. 45 (Summer 1995), pp. 373–388.

Frederic D. Frank; Cabot L. Jaffee, "Training and development are not enough: Testing must also meet the new challenges of the twenty–first century," Journal of Management Development, vol. 14, No. 6, (1995) MCB University Press, Ltd.

Michelle Meyer, "Solving Chronic Quality Problems," Quality Progress, vol. 23, No. 5, (May 1990), pp. 37–42.

P.C.B. Phillips, S. Ouliaris, "Testing for Cointegration Using Principal Components Methods," Journal of Economic Dynamics & Control, vol. 12, No. 2, 3, (Jun./Sep. 1988), pp. 205–230.

Donald W. K. Andrews, "Chi–Square Diagnostic Tests for Econometric Models: Introduction and Applications," Journal of Econometrics, vol. 37, No. 1, (Jan. 1988), pp. 135–156.

Weston H. Agor, "Use intuitive intelligence to increase productivity," HR Focus, vol. 70, No. 9, (Sep. 1993) American Management Association, p. 9.

Weston H. Agor, "Nurturing Executive Intrapreneurship With A Brain–Skill Management Program," Business, vol. 31, No. 3, (May/Jun. 1988), pp. 12–15.

Paul Elliott, "Power–Charging People's Performance," Training and Development, (Alexandria, VA), vol. 50, (Dec. 1996), pp. 46–49.

Jane R. Goodson, Gail W. McGee, James F. Cashman, "Situational Leadership Theory: Test of Leadership Prescriptions," Group & Organization Studies, vol. 14, No. 4, (Dec. 1989), pp. 446–461.

Tudor Richards, Simon Aldridge, Kevin Gaston, "Factors Affecting Brainstorming: Towards the Development of Diagnostic Tools For Assessment of Creative Performance," R & D Management, vol. 18, No. 4, (Oct. 1988), pp. 309–320.

Richard Gonzalez, "When Words Speak Louder Than Actions: Another's Evaluations Can Appear More Diagnostic Than Their Decisions," Organizational Behavior & Human Decision Processes, vol. 58, No. 2, (May 1994), pp. 214–245.

Jonathan Baron, John C. Hershey, "Heurustics and Biases in Diagnostic Reasoning: I. Priors, Errors Costs, and Test Accuracy," Organizational Behavior & Human Decision Processes, vol. 41, No. 2, (Apr. 1988), pp. 259–279.

Jane Pickard, "At the Heart of Business," Personnel Management, vol. 26, No. 3, (Mar. 1994), pp. 34–37.

Rodney B. McGraw, "Union–Management Interface: Using the Competing Values Framework as a Diagnostic Tool to Bring Increased Involvement at the Plant Level," Human Resource Management, vol. 32, No. 1, (Spring 1993), pp. 51–73.

Lee A. Graf, Masoud Hemmasi, Warren Nielson, "Importance–Satisfaction Analysis: A diagnostic tool for organizartional change," Leadership & Organization Development Journal, vol. 13, No. 6, (1992), pp. 8–12, MCB University Press, Ltd.

Jacqueline McDonald, and Others, "Details of Performance on Computer and Paper Administered Versions of a Test of Whole Number Computation Skills," Focus on Learning Problems in Mathematics, Summer 1992, Vol. 14, No. 3, pp. 15–27.

Mary Ann Santos De Barona, Andres Barona, "The Assessment of Culturally and Linguistically Different Preschoolers," Early Childhood Research Quarterly, vol. 6, No. 3, pp. 363–377, Sep. 1991.

Torleiv Hoien, Ingvar Lundberg, "A Strategy for Assessing Problems in Word Recognition among Dyslexics," Scandinavian Journal of Educational Research, vol. 33, No. 3, pp. 185–201, 1989.

Lorynne D. Cahn, "Sex and Grade Differences and Learning Rate in an Intensive Summer Reading Clinic," Psychology in the Schools, vol. 25, No. 1, pp. 84–91, Jan. 1988.

Brian Unger, "Operation Extermination: How to Deal With Writer's Apprehension," Highway One, vol. 9, No. 3, pp. 29–33, Fall 1986.

Michael S. Trevisan, "Review of the Draw a Person: Screening for Emotional Disturbance," Measurement and Evaluation in Counseling and Development, vol. 28, No. 4, pp. 225–229, Jan. 1996.

Rhonda S. Dennis, "An Examination of English as a Second Language Assessment Tools Utilized by Adult Literacy Providers in Pennsylvania," PAACE Journal of Lifelong Learning, vol. 5, pp. 1–13, 1996.

Diane Darwish, Rosa A. Hagin, "The Clock Drawing Test: Establishing Normative Standards for Use in Psycheducational Assessment," Learning Disabilities: A Multidisciplinary Journal, vol. 6, No. 2, pp. 31–39, Aug. 1995.

Paul D. Nichols, "A framework for developing cognitively diagnostic assessments," Review of Educational Research, vol. 64, No. 4, (Winter 1994), American Educational Research Association.

Mark D. Everson, Barbara W. Boat, "Putting the Anatomical Doll Controversy in Perspective: An Examination of the Major Uses and Criticisms of the Dolls in Child Sexual Abuse Evaluations," Child Abuse and Neglect: The International Journal, vol. 18, No. 2, pp. 113–129, Feb. 1994.

Roger Farr, Beth G. Greene, "The Indiana State Assessment System: Are We Up to the Challenges?," In: Chalkboard, vol. 42, No. 1, pp. 2–4, Fall–Winter 1994.

Clyde Ahmad Winters, and Others, "The Role of a Computer–Managed Instructional System's Prescriptive Curriculum in the Basic Skill Areas of Math and Reading Scores for Correctional Pre–Trial Detainees (Inmates)," Journal of Correctional Education, vol. 44, No. 1, pp. 10–17, Mar. 1993.

Alison Solomon, "Clinical Diagnosis among Diverse Populations: A Multicultural Perspective," Families in Society, vol. 73, No. 6, pp. 371–377, Jun. 1992.

Alison Solomon, "Assessing the Assessments: A Comparison of Two Clinical Profiles," Journal of Communication Disorders, vol. 24, No. 5–6, pp. 367–379, Oct.–Dec. 1991.

Sidney M. Moon, and Others, "Identification Procedures: Bridging Theory and Practice," Gifted Child Today (GCT) vol. 14, No. 1, pp. 30–36, Jan.–Feb. 1991.

Suzanne Lane, "Implications of Cognitive Psychology for Measurement and Testing: Assessing Students' Knowledge Structures," Educational Measurement: Issues and Practice, vol. 10, No. 1, pp. 31–33, 36, Spring 1991.

Nancy M. Arthur, "The Assessment of Burnout: A Review of Three Inventories Useful for Research and Counseling," Journal of Counseling and Development, vol. 69, No. 2, pp. 186–189, Nov.–Dec. 1990.

Gail M. Cheramie, Ron P. Edwards, "The AAMD ABS–SE, Part Two: Criterion–Related Validity in a Behavior–Disordered Sample," Psychology in the Schools, vol. 27, No. 3, pp. 186–195, Jul. 1990.

Joanne F. Carlisle, "The Use of the Sentence Verification Technique in Diagnostic Assessment of Listening and Reading Comprehension," Learning Disabilities Research, vol. 5, No. 1, pp. 33–44, Winter 1989.

Nancy V. Wood, "Reading Tests and Reading Assessment," Journal of Developmental Education, vol. 13, No. 2, pp. 14–16, 18–19, Winter 1989.

Timothy Shanahan, "Tests for Learning Disabilities (Assessment)," Reading Teacher, vol. 43, No. 2, pp. 176–177, Nov. 1989.

Stephen J. Bavolek, "Assessing and Treating High–Risk Parenting Attitudes," Early Child Development and Care, vol. 42, pp. 99–112, Jan. 1989.

Jo Anne Thomas, "A Standardized Method for Collecting and Analyzing Language Samples of Preschool and Primary Children in the Public Schools," Language, Speech, and Hearing Services in Schools, vol. 20, No. 1, pp. 85–92, Jan. 1989.

Leslie L. Crossman, and Others, "Influence of Cognitive Variables on MMPI–2 Scale Scores," Measurement and Evaluation in Counseling and Development, vol. 27, No. 3, pp. 151–157, Oct. 1994.

Mark J. Fenster, "Statistics and Adult Learners: Assessing Potential Problems," Journal of Studies in Technical Careers, vol. 14, No. 1, pp. 11–22, 1992.

Kathleen Sheehan, Robert J. Mislevy, "Integrating Cognitive and Psychometric Models to Measure Document Literacy," Journal of Educational Measurement, vol. 27, No. 3, pp. 255–272, Fall 1990.

Adamantios Diamantopoulos, Nina Reynolds, Bodo Schlegelmilch, "Pretesting in Questionnaire Design: The Impact of Respondent Characteristics on Error Detection," Journal of the Market Research Society, vol. 36, No. 4, (Oct. 1994), pp. 295–313.

Brian W. Gill, "Pretesting reveals more," American Printer, vol. 212, No. 6, (Mar. 1994), p. 92, MacLean–Hunter Publishing.

Karen Whitehill King, John D. Pehrson, Leonard N. Reid, "Pretesting TV commercials: Methods, measures, and changing agency roles," Journal of Advertising vol. 22, No. 3, (Sep. 1993) pp. 85–97.

Anonymous Author, "Test marketing a new prodcut: When it's a good idea and how to do it," Profit Building Strategies for Business Owners, vol. 23, No. 3, (Mar. 1993), pp. 14–15, TPR Publishing Co., Inc.

Gunar E. Liepens, "Sound Data Are a Sound Investment," Quality Progress, vol. 22, No. 9, (Sep. 1989), pp. 61–64.

David Roman, "Evaluation Starts Long Before Training Begins," Computer Decisions, vol. 16, No. 7, (Jun. 1984), pp. 82–84.

Bob Mezoff, "Six More Benefits of Pretesting Trainees," Training, vol. 20, No. 8, (Aug. 1983), pp. 45–47.

Sirkka Gudan, "Effect of Individualized Instruction and Pretesting on Student Performance in Basic Mathematics," Michigan Community College Journal: Research & Practice, vol. 1, No. 1, pp. 79–89, Spring 1995.

Lori Bailey, "Compacting Curriculum Through Pretesting," Teaching Exceptional Children, vol. 24, No. 3, pp. 55–56, Spring 1992.

David W. Dalton, David A. Goodrum, "The Effects of Computer–Based Pretesting Strategies on Learning and Continuing Motivation," Journal of Research on Computing in Education, vol. 24, No. 2, pp. 204–213, Winter 1991.

David M. Dush, Stacey E. Webb, Jr., "Pretesting Enchancement of Parent Compliance in a Prevention Program for High–Risk Children," Evaluation and the Health Professions, vol. 10, No. 2, pp. 201–205, Jun. 1987.

David A. Cole, "Statistic for Small Groups: The Power of the Pretest," Journal of the Association for Persons with Severe Handicaps (JASH), vol. 13, No. 3, pp. 142–146, Fall 1988.

Craig W. Johnson, "A More Rigorous Quasi–Experimental Alternative to the One–Group Pretest–Posttest Design," Educational and Psychological Measurement, vol. 46, No. 3, pp. 585–591, Autumn 1986.

Eugene W. Muller, "Application of Experimental and Quasi–Experimental Research Designs to Educational Software Evaluation," Educational Technology, vol. 25, No. 10, pp. 27–31, Oct. 1985.

Adam Kormann, Siegfried Ludwig Sporer, "Learning Tests,—Concepts and Critical Evaluation," Studies in Educational Evaluation, vol. 9, No. 2, pp. 169–184, 1983.

Richard D. Arvey, Scott E. Maxwell, and Eduardo Salas, "The Relative Power of Training Evaluation Design Under Different Cost Configurations," Journal of Applied Psychology, vol. 77, No. 2, (Apr. 1992), pp. 155–160.

Anthony E. Kelly, Angela O'Donnell, "Hypertext and the Study of Preservice Teachers: Issues in Instructional Hypertext Design," Journal of Educational Computing Research, vol. 10, No. 4, pp. 373–387, 1994.

Bruce A. Thyer, and Others, "Structured Study Questions as a Social Work Teaching Method: A Controlled Experimental Study," Innovative Higher Education, vol. 16, No. 3, pp. 235–245, Spring 1992.

Joanna P. Williams, Nancy J. Ellsworth, "Teaching Learning Disabled Adolescents to Think Critically Using a Problem–Solving Schema," Exceptionality, vol. 1, No. 2, pp. 135–146, 1990.

Jean A. Mausehund, Susan A. Timm, Albert S. King, "Diversity Training: Effects of an Intervention Treatment on Nonverbal Awareness," Business Communication Quarterly, vol. 58, No. 1, (Mar. 1995), pp. 27–30.

Michael A. Champion, Carol L. McClelland, "Follow–Up and Extension of the Interdisciplinary Costs and Benefits of Enlarged Jobs," Journal of Applied Psychology, vol. 78, No. 3, (Jun. 1993), pp. 339–351.

Scot Burton, Mark W. Johnson, Elizabeth J. Wilson, "An Experimental Assessment of Alternative Teaching Approaches for Introducing Business Ethics to Undergraduate Business Students," Journal of Business Ethics, vol. 10, No. 7, (Jul. 1991), pp. 507–517.

Michael R. Veall, "Bootstrapping the Process of Model Selection: An Econometric Example," Journal of Applied Econometrics, vol. 7, No. 1, (Jan.–Mar. 1992), pp. 93–99.

John H. Cochrane, "A Critique of the Application of Unit Root Tests," Journal of Economic Dynamics & Control, vol. 15, No. 2, (Apr. 1991), pp. 275–284.

Allan D. Shocker, William G. Hall, "Pretest Market Models: A Critical Evaluation," Journal of Product Innovation Management, vol. 3, No. 2, (Jun. 1986), pp. 86–107.

Yi L. Zhou, David C. Riccio, "Pretesting Cuing Can Alleviate the Forgetting of Contextual Stimulus Attributes," Learning and Motivation 25, No. 3, pp. 233–244, Academic Press.

Golnaz Sadri, Peggy J. Snyder, "Methodological Issues in Assessing Training Effectiveness," Journal of Managerial Psychology, vol. 10, No. 4, pp. 30–32, MCB University Press, 1995.

Matt McDonough, "Add Control to your Training," Managers Magazine, vol. 61, No. 12, (Dec. 1986), pp. 28–29, 35–36.

Niki McCurry, Alan McCurry, "Writing Assessment for the $21^{st}$ Century," Computing Teacher, vol. 19, No. 7, pp. 35–37, Apr. 1992.

Roy B. Clariana, "A Computer Administered CLOZE Placement Test and a Standardized Reading Test," Journal of Computers in Mathematics and Science Teaching, vol. 10, No. 3, pp. 107–113, Spring 1991.

John A. Willis, "Learning Outcome Testing Program: Standardized Classroom Testing in West Virginia Through Item Banking, Test Generation, and Curricular Management Software," Educational Measurement: Issues and Practice, vol. 9, No. 2, pp. 11–14, Summer 1990.

Carolyn B. Matalene, Nancy Barendse, "Transaction in Holistic Scoring: Using a Computer to Understand the Process," Journal of Teaching Writing, vol. 8, No. 2, pp. 87–107, Fall–Winter 1989.

William M. Borton, "The Effects of Computer Managed Learning on Mathematics Test Scores in the Elementary School," Journal of Computer–Based Instruction, vol. 15, No. 3, pp. 95–98, Summer 1988.

James E. Bruno, "Using Computer for Instructional Delivery and Diagnosis of Student Learning in Elementary Schools," Computers in the Schools, vol. 4, No. 2, pp. 117–134, Summer 1987.

James E, Bruno, "Admissible Probability Measures in Instructional Management," Journal of Computer–Based Instruction, vol. 14, No. 1, pp. 23–30, Winter 1987.

Kelly A. Woestman, "Test Generators: The Next Generation," History Microcomputer Review, vol. 11, No. 1, pp. 26–37, Spring 1995.

John Waddick, "Case Study: The Creation of a Computer Learning Environment as an Alternative to Traditional Lecturing Methods in Chemistry," Educational and Training Technology International, vol. 31, No. 2, pp. 98–103, May 1994.

Lynn S. Fuchs, and Others, "Technological Advances Linking the Assessment of Students' Academic Proficiency to Instructional Planning," Journal of Special Education Technology, vol. 12, No. 1, pp. 49–62, Spring 1993.

Debbie Clayton, Geoff Arger, "Computers in the Instructional Process in Distance Education–Examining Relationships between usage, Expectations and Software Acquisition," Distance Education, vol. 10, No. 2, pp. 242–257, 1989.

David B. Palumbo, Michael W. Reed, "Rationale for Construction of Microcomputer–Based Evaluation Subsystems," Journal of Research on Computing in Education, vol. 22, No. 1, pp. 59–68, Fall 1989.

Dominique A.M.X. Abrioux, "Computer–Assisted Language Learning and Distance Education," Journal of Distance Education, vol. 4, No. 1, pp. 20–35, Spring 1989.

D. Richard Freeze, "Microcomputers in Special Education," Canadian Journal of Special Education, vol. 4, No. 1, pp. 9–22, 1988.

Jeffrey L. Newton, David S. Thomas, "The CLIO Project: A Program of Computer–Based Instruction in the Western History Survey," History Teacher, vol. 19, No. 2, pp. 181–199, Feb. 1986.

Joseph Lloyd–Jones, "Computers for Exams," Chartered Accountants Journal of New Zealand, (Mar. 1996), pp. 17–18.

Marvin J. Croy, and Others, "Human–Supplied versus Computer–Supplied Feedback: An Empirical and Pragmatic Study," Journal of Research on Computing in Education, vol. 26, No. 2, pp. 185–204, Winter 1993–94.

Evelyn Spradley, "Assisting Adult Higher Education via Personal Computer: Technology and Distance Education," Cause/Effect, vol. 16, No. 1, pp. 37–42, Spring 1993.

Joseph M. Scandura, Alice B. Scandura, Intelligent CBI Systems for Diagnostic Testing and Instruction, Focus on Learning Problems in Mathematics, vol. 9, No. 1, pp. 53–67, Winter 1987.

Clint N. Richards, Dennis R. Ridley, "Factors Affecting College Students' Persistence in On–Line Computer Managed Instruction," College Student Journal, vol. 31, No. 4, (1997).

Laurel Halloran, "A Comparison of Two Methods of Teaching: Computer Managed Instruction and Keypad Questions Versus Traditional Classroom Lecture," Computers in Nursing, vol. 13, No. 6, (1995).

Garry G. Ladd, "Program Design: Computer Managed Instruction In Physical Fitness and Weight Training," National Strength & Conditioning Association Journal, vol. 15, No. 4, (Jul. 1993).

Andrew S. Gibbon, Peter G. Fairweather, A. F. O'Neal, "The Future of Computer–Managed Instruction," Educational Technology, vol. XXXIII, No. 5, (May 1993).

M. Szabo, T. C. Montgomerie, "Two Decades of Research on Computer–Managed Instruction," Journal of Research on Computing in Education, vol. 25, No. 1, (Fall 1992).

Anthony G. Frisbie, and Others, "Computer Managed Instruction in a Large Undergraduate Teacher Education Course," Computers in the Schools, vol. 8, No. 1–2–3, (1991).

Nancy Golden, and Others, "Effectiveness of Guided Practice During Remedial Reading Instruction: An Application of Computer–managed Instruction," The Elementary School Journal, vol. 90, No. 3, (Jan. 1990).

David Stanton, "What's It Going To Be? Rigid Computer Learning or Electronic, Seat–Of–The–Pants Exploration?" Computel, vol. 11, No. 5, (May 1989).

James J. L'Allier, Kurt W. Miles, "The Skill Builder Philosophy: Learning by Design," (Jan. 9, 1996) Discussion Paper Series.

Richard Venezky, Luis Osin, "The Intelligent Design of Computer–Assisted Instruction," ch. 9, Longman Publishing Group, 1991.

Walter Dick, Lou Carey, "The Systematic Design of Instruction," Scott, Foresman and Company, 1985.

Robert J. Kibler, Donald J. Cegala, Larry L. Baker, David T. Miles, "Objectives for Instruction and Evaluation, A Revision of Behavioral Objectives and Instruction," pp. 66–71, Allyn and Bacon, Inc., 1974.

Robert D. Tennyson, "Use of Adaptive Information for Advisement in Learning Concepts and Rules Using Computer–Assisted Instruction," American Educational Research Journal, (1981).

Wolfgang Rothen, Robert D. Tennyson, "Application of Bayes' Theory In Designing Computer–Based Adaptive Instructional Strategies," Educational Psychologist, 1978, pp. 317–323.

Esther R. Steinberg, "Review of Student Control in Computer–Assisted Instruction," Journal of Computer Based Instruction, Feb. 1977, vol. J, No. 3, pp. 84–90.

Scott Bergstrom, "CMI Guidelines for Interoperability AICC," Oct. 25, 1993.

Scott Bergstrom, "Glossary of Terms Related to Computer–Based Training," Oct. 20, 1992.

Paul Rahn, "One more time: Test trainees before you train them," Training/HRD, Apr. 1980, vol. 17, No. 4, pp. 4–5, 50–51.

Adam Kormann, Siegfried Ludwig Sporer, "Learning Tests—Concepts and Critical Evaluation," Studies in Educational Evaluation, vol. 9, pp. 169–184, Pergamon Press, Ltd., 1983.

Bob Mezoff, "Six More Benefits of Pretesting Trainees," TRAINING Magazine, Aug. 1983, vol. 20, No. 8, pp. 45–47.

Mirjam Sprangers and Johan Hoogstraten, "Pretesting Effects in Retrospective Pretest–Posttest Designs," Journal of Applied Psychology, Apr. 1989, vol. 74, No. 2, pp. 265–272.

Esther R. Steinberg, "Computer–Assisted Instruction: A Synthesis of Theory, Practice, and Technology," pp. 12–13, 18–19, 28–29, 74–75, 86–87, 90–91, 96–97, 102–103, 160–161, 164–165, 168–169, Lawrence Earlbaum Associates, Inc., 1991.

Yashuhiro Morimoto, Kikumi K. Tatsuoka, "An Interactive Diagnostic System for Fraction Addition," Computer Based Education Research Laboratory (CERL), Jan. 1984, University of Illinois at Urbana–Champaign.

Kikumi K. Tatsuoka, Maurice M. Tatsuoka, Robert Baillie, "Application of Adaptive Testing to a Fraction Test," Computer Based Education Research Laboratory (CERL), Jan. 1984, University of Illinois at Urbana–Chanpaign.

Kikumi Tatsuoka, "A Theory of IRT–Based Diagnostic Testing," Computer Based Education Research Laboratory (CERL), Mar. 10, 1991, University of Illinois at Urbana–Champaign.

Richard E. Hurlock, "Applications of Pretest Branching Designs to CAI Basic Electronics Training," Naval Personnel and Training Research Laboratory, Branch Report SRR 73–8, Sep. 1972.

Martin A. Siegel, Dennis M. Davis, "Understanding Computer–Based Education," University of Illinois at Urbana–Champaign, pp. 49–51, Random House, 1986.

Richard C. Atkinson and H. A. Wilson, "Computer–Assisted Instruction," Stanford University, Academic Press, 1969.

Richard Dennis and Robert J. Kansky, "Instructional Computing, An Action Guide For Educators," Chapter 8—An Examination of Computer–Assisted Testing Operations, Scott, Foresman and Company, 1984.

Byron L. Deshaw, "Developing Competencies for Individualizing Instruction," pp. 82, 96–97, Charles E. Merrill Publishing Company, 1973.

Francoise Blin, Diana Wilson, "The Use of Pretest and Post–Test in Call: A case Study," Computers Educ., vol. 23, No. ½, pp. 143–150, 1994, Elsevier Science, Ltd.

Larry A. Benshoof, Simon Hooper, "The Effects of Single and Multiple–Window Presentation on Achievement During Computer–Based Instruction," Journal of Computer–Based Instruction, Autumn 1993, vol. 20, No. 4, pp. 113–117.

Frank J. Papa, Jon I. Young, Gerald Knezek, Robert J. Bourdage, "A Differential Diagnostic Skills Assessment and Tutorial Tool," Computers Educ., vol. 18, No. 1–3, pp. 45–50, 1992, Pergamon Press.

Thomas Diessel, Axel Lehmann, Julita Vassileva, "Individualized Course Generation: A Marriage Between CAL and ICAL," Computers Educ., vol. 22, No. ½, pp. 57–64, 1994, Pergamon Press, Ltd.

Joan E. Watson, John C. Belland, "Use of Learner Data in Selecting Instructional Content For Continuing Education," Journal of Instructional Development, 1985, vol. 8, No. 4, pp. 29–33.

Riichiro Mizoguchi, "Intelligent Tutoring Systems, the Current State of the Art," The Transactions of the IEICE, vol. E 73, No. 3, Mar. 1990, pp. 297–307.

Robert Tennyson, "Artificial Intelligence Methods in Computer–Based Instructional Design—The Minnesota Adaptive Instructional System, " Journal of Instructional Development, 1984, vol. 7, No. 3, pp. 17–22.

Robert J. Lathrop, "The Number of Performance Assessments Necessary to Determine Competence," Journal of Instructional Development, 1983, vol. 6, No. 3, pp. 26–31.

Debora L. Adler, "Getting Clean With Herkimer: A Software Package for Teaching Children In Special Education to Classify Common Objects," Computers & Education, vol. 23, No. 3, pp. 227–235, 1994, Elsevier Science, Ltd.

Ok–Choon Park and Robert D. Tennyson, "Computer–based Instructional Systems for Adaptive Education: A Review," Contemporary Education Review, Fall 1983, vol. 2, No. 2, pp. 121–135.

Beverly Woolf and David D. McDonald, "Building A Computer Tutor: Design Issues," AEDS Monitor, vol. 23, Nos. 9, 10 Mar./Apr. 1985, pp. 10–18.

Brian S. Lantz, William S. Bregar, Arthur M. Farley, "An Intelligent CAI System for Teaching Equation Solving," Journal of Computer–Based Instruction, Summer 1983, vol. 10, Nos. 1 & 2, pp. 35–42.

Robert D. Tennyson, Dean L. Christensen, Seong Ik Park, "The Minnesota Adaptive Instructional System: An Intelligent CBI System," Journal of Computer–based Instruction, Winter 1984, vol. 11, No. 1, pp. 2–13.

Ann Barron and Donna Baumbach, "A CD–ROM Tutorial: Training for a New Technology," Educational Technology, vol. XXX, No. 6, Jun. 1990, pp. 20–23.

Theodore W. Frick, "Bayesian Adaptation During Computer–Based Tests and Computing–Guided Practice Exercises," Journal of Educational Computer Research, vol. 5(1), pp. 89–114, 1989, Baywood Publishing Company, Inc.

Robert M. Gagne and M. David Merrill, "In Conversation," Educational Technology, vol. XXXI, No. 1, Jan. 1991, pp. 34–40, Educational Technology Publications, Inc.

Robert M. Gagne, Walter Wager, Alicia Rojas, "Planning and Authoring Computer–Assisted Instruction Lessons," Educational Technology, vol. XXI, No. 9, Sep. 1981, pp. 17–21, Educational Technology Publications, Inc.

George Flouris, "Developing Appropriate Designs for Instructional Computer Programs in the Social Studies," Social Studies Journal, Jan./Feb. 1987, vol. 78, No. 1, pp. 17–22.

Walter Wager, "Design Considerations for Instructional Computing Programs," Journal of Educational Technology Systems, vol. 10(3), 1981–82, pp. 261–270.

Peter E. Smith, "Some Learning and Instructional Theory Considerations for the Development of Computer Related Instructional Materials," Educational Technology, vol. XXIX, No. 11, Nov. 1989, pp. 18–19.

Robertta H. Barba, "The Effects of Imbedding an Instructional Map in Hypermedia Courseware," Journal of Research on Computing in Education, vol. 25, No. 4, Summer 1993, pp. 405–413.

Robert D. Tennyson, Dean L. Christensen, "Automating Instructional Systems Develeopment," pp. 886–915, U.S. Department of Education, 1991.

Robert D. Tennyson, "Advisement and Management Strategies as Design Variables in Computer–Assisted Instruction," U.S. Department of Health, Education & Welfare, National Institute of Education, Apr. 1980, pp. 1–21.

Robert D. Tennyson, "Adaptive Instruction Models: Diagnostic and Prescriptive," U.S. Department of Health, Education & Welfare, National Institute of Education, Mar. 1978, pp. 1–9.

Dana L. Temme, "Computer Approach to Teach Study Skills to Third Grade Students and Parents," 1991.

Simon Hooper, Michael J. Hanafin, "The Effects of Group Composition on Achievement, Interaction, and Learning Efficiency during Computer–Based Cooperative Instruction," Educational Technology, Research and Development, vol. 39, No. 3, pp. 27–40, 1991.

Lloyd P. Rieber, Michael J. Hannafin, "Effects of Textual and Animated Orienting Activities and Practice on Learning from Computer–Based Instruction," Computers in the Schools, vol. 5, No. 1–2, pp. 77–89, 1988.

Norm Crozer, "Computer–Based Spelling Instruction," 1994.

Susan K. Lippert, Mary J. Granger, "Tired of Teaching Software Applications?" 1998.

David C. Byrum, "Formative Evaluation of Computer Courseware: An Experimental Comparison of Two Methods," Journal of Educational Computing Research, vol. 8, No. 1, pp. 69–80, 1992.

Karen Jolicoeur, Dale E. Berger, "Implementing Educational Software and Evaluating Its Academic Effectiveness: Part I," Educational Technology, vol. 28, No. 9, pp. 7–13, Sep. 1988.

N. Washington, M. Parnianpour, J. M. Fraser, "Evaluation and Assessment of a Biomechanics Computer–Aided Instruction," Computers & Education, vol. 32, No. 3, pp. 207–220, Apr. 1999.

Robert M. Lindsay, "A Comparative Study of Teaching Typing Skills on Microcomputers," 1982.

Michael W. Cronin, "Teaching Listening Skills via Interactive Videodisc," T.H.E. Journal, vol. 21, No. 5, pp. 62–68, Dec. 1993.

William C. Juchau, "Assessment and Development of Student Problem–Solving Skills Using Computer–Managed and Computer–Assisted Instruction," Educational Resources Information Center (ERIC), No. ED302214, 1988.

Michael J. Hannafin, "The Role of Practice Versus Cuing During Computer–Based Instruction," 1987.

Robert D. Hannafin, Howard J. Sullivan, "Learner Control in Full and Lean CAI Programs," Eductional Technology Research and Development, vol. 43, No. 1, pp. 19–30, 1995.

Wim J. Van Der Linden, Michal A. Zwarts, "Some Procedures for Computerized Ability Testing. Project Psychometric Aspects of Item Banking No. 13. Research Report 86–10," 1986.

Richard L. Ferguson, "Computer Assistance for Individualizing Measurement," 1971.

Charles R. Dills, Alkexander Romiszowski, "The Application of Formal Design Theories to the Production of Videodisc/CBI Instructional Systems," 1990.

Nancy C. Stumhofer, "The Impact of Computer–Assisted Instruction on Students' Knowledge of Basic Writing Skills," 1988.

Ok–Choon Park, Robert D. Tennyson, "Computer–Based Response–Sensitive Design Strategies for Selecting Presentation Form and Sequence of Examples in Learning of Coordinate Concepts," Journal of Educational Psychology, vol. 78, No. 2, pp. 153–158, Apr. 1986.

Robert D. Tennyson, Dean L. Christensen, "Educational Research and Theory Perspective on Intelligent Computer–Assisted Instruction," 1989.

Tom Murray, Beverly Woolf, Knowledge Representation in a Physics Tutor. COINS Technical Report 86–37, 1986.

Robert M. Gagne, "Is Educational Technology in Phase?" Educational Technology, vol. XX, No. 2, Feb. 1980, pp. 7–14.

James Hartley, Ivory K. Davies, "Preinstructional Strategies: The Role of Pretests, Behavioral Objectives, Overviews and Advance Organizers," Review of Educational Research Journal, Spring 1976, vol. 46, No. 2, pp. 239–265.

Robert D. Tennyson and Wolfgang Rothen, University of Minnesota, "Pre–Task and On–Task Adaptive Design Strategies for Selecting Number of Instances in Concept Acquisition," Journal of Educational Psychology, 1977, Vol. 69, No. 5, pp. 586–592, American Psychological Association, Inc.

Robert D. Tennyson, University of Minnesota, "Instructional Control Strategies and Content Structure as Design Variables in Concept Acquisition Using Computer–Based Instruction," Journal of Educational Psychology, Aug. 1980, vol. 72, No. 4, pp. 525–532, American Psychological Association, Inc.

Melvin R. Novick and Charles Lewis, "Prescribing Test Link for Criterion–Referenced Measurement," ACT Technical Bulletin No. 18, The American College Testing Program, Jan. 1974.

David W. Dalton and David A. Goodrum, "The Effects of Computer–Based Pretesting Strategies on Learning and Continuing Motivation," Journal of Research on Computing in Education, Winter 1991, vol. 24, No. 2, pp. 204–213.

Ok–Choon Park, "Handbook of Research for Educational Communications and Technology," pp. 570–571, 579, 634–638, 644–645, Macmillan Library Reference USA, Simon & Schuster Macmillan, 1996.

"Instructional Design: Principles and Applications," Educational Technology Publications, pp. 150–151, 1977.

"Instructional Design: Readings; Part Three, Diagnosing Preinstructional Behavior," pp. 137–138, Prentice–Hall, Inc. 1971.

"Objectives for Instruction and Evaluation, A Revision of Behavioral Objectives and Instruction," Ch. 3, pp. 65–71, Allyn and Bacon, Inc., 1974.

Stephen Yelon, "Making Decisions About Pretesting, It's Not a Simple Matter," Performance & Instruction Journal, Nov. 1985, pp. 9–14.

Walter Dick, "The Function of the Pretest in the Instructional Design Process," Performance & Instruction Journal, May 1986.

H. W. Gustafson and David L. Toole, "Effects of Adjunct Questions, Pretesting, and Degree of Student Supervision on Learning From an Instructional Text," Journal of Experimental Education, vol. 39, No. 1, Fall 1970, pp. 53–58.

James Hartley, Janet Holt, and Fiona Swain, "The Effects of Pre–Tests, Interim Tests, and Age On Post–Test Performance Following Self–Instruction," Journal of The Association for Programmed Learning and Educational Technology, vol. 7, 1970, pp. 250–256, Sweet & Maxwell.

John M. Newton and Albert E. Hickey, "Sequence Effects in Programmed Learning of a Verbal Concept," Journal of Educational Psychology, Jun. 1965, vol. 56, No. 3, pp. 140–147, The American Psychological Association, Inc.

J. Peeck, "Effect of Pre Questions on Delayed Retention of Prose Material," Journal of Educational Psychology, 1970, vol. 51, No. 3, pp. 241–246, American Psychological Association, Inc.

M.J. Apter, D. Boorer, and S. Murgatroyd, "A Comparison of the Effects of Multiple Choice and Constructed Response Pretests in Programmed Instruction," Journal of the Association for Programmed Learning and Educational Technology, vol. 8, 1971, pp. 251–256.

Michael J. Apter and David R. Boorer, "The Effect of Multiple–Choice Pre–Testing on Post–Test Performance in Programmed Instruction," Journal of the Association for Programmed Learning and Educational Technology, vol. 8, 1971, pp. 125–130.

S. Jay Samuels, "The Effect of Post–Test Relevant Pre–tests and Discussion–Type Feedback on Learning and Retension," Psychonomic Science, vol. 16(2), 1969, pp. 67–68, Psychonomic Journals, Inc.

Richard H. Bloomer and Andrew J. Heitzman, "Pre–testing and the Efficiency of Paragraph Reading," Journal of Reading, Jan. 1965, vol. VIII, No. 3, pp. 219–223.

S. L. Presser, "Educational Research and Statistics, A Simple Apparatus Which Gives Tests and Scores—and Teaches," School and Society, vol. XXIII, Jan.–Jun. 1926, pp. 373–376, The Science Press.

J. J. Stein, "The Effect of a Pre–Film Test on Learning From an Educational Sound Motion Picture," Jan. 1953.

Wayne W. Welch, Herbert J. Walberg, "Pretest and Sensitization Effects in Curriculum Evaluation," The American Educational Research Journal, vol. VII, No. 4, Nov. 1970.

James Hartley, "Observations on the Training Functions of a Pre–Test," Industrial Training International, vol. 4, No. 3, Mar. 1969, p. 134.

J. Hartley and Janet Holt, "The Effects of Pre–testing on Post–test Performance Following Programmed Instruction," pp. 83–89.

Sidney L. Miller, and Daniel Krautheim, "The Effect of Pretests on Learning in a Programmed Sequence," American Association of Dental Schools, Journal of Dental Education, Dec. 1970, vol. 34, pp. 27–30.

Unknown Author, "Implementing Instructional Design With Peer III eLearning Software," Date Unknown, pp. 1–10.

Daniel R. Tobin, "The Mandate for an Enterprise–Wide View and Direction of Training," Jan. 16, 1997, pp. 1–21.

Unknown Author, Untitled, Document dated Aug. 29, 1988.

Unknown Author, "TenCORE Computer Managed Instruction Automated Course Administration," undated.

Unknown Author, "Information on Integrated Learning Systems Evaluation WICAT Systems," undated.

Unknown Author, Unititled Product Literature, undated, McDonnell Douglas Corp.

Mark Urban–Lurain, "Intelligent Tutoring Systems: An Historic Review of the Context in the Development of Artificial Intelligence and Educational Psychology," undated.

Unknown Author, "Bit Learning, Inc. and SmartForce Form e–Learning Partnership," undated.

Unknown Author, "PLATO Learning Offers Web–Based Assessment System to Help Students Prepare for State–Mandated Tests," Aug. 24, 2000.

Unknown Author, "Tennessee Tomorrow Unveils Research Results & Training/Education Initiative," Apr. 4, 1996.

Bryan L. Chapman, "Profile of a Publishing Engine for Online Learning: The Jupiter Project," undated, pp. 1–15.

Valerie J. Shute, Joseph Psotka, "19.Intelligent Tutoring Systems: Past, Present, and Future," pp. 570–572, Soft Technologies: Instructional and Information Design Research, undated.

Diana Laurillard, "Computers and the emancipation of students: giving control to the learner," Instructional Science, vol. 16, pp. 3–18, (1987), Martinus Nijhoff Publishers.

Scott Bergstrom, "Guidelines for CBT Courseware Interchange," Oct. 31, 1995.

M. David Merrill, "The New Component Design Theory: Instructional Design for Courseware Authoring," Instructional Science, vol. 16, pp. 19–34, (1987), Martinus Nijhoff Publishers (Kluwer), Dordrecht.

Steck–Vaughn Publishing Corporation, "Steck–Vaughn Expands Test Preparation Product Line Through Acquisition of Berrent Publications, Inc.," Nov. 15, 1994.

Steck–Vaughn Publishing Corporation, "Steck–Vaughn Publishing Corporation Reports First Quarter Results," Apr. 26, 1995.

Steck–Vaughn Publishing Corporation, "Steck–Vaughn Publishing Announces Second Quarter Results," Aug. 1, 1995.

Steck–Vaughn Publishing Corporation, "Steck–Vaughn Publishing Corporation Reports Third Quarter Results," Oct. 25, 1995.

Robert D. Tennyson, "Use of Adaptive Information for Advisement in Learning Concepts and Rules Using Computer–Assisted Instruction," undated.

Unknown Author, "Educational Technology: Education and Glossary of Terms," 1977, p. 213, vol. 1, Association for Educational Communications and Technology.

Barbara M. Taylor and Barbara J. Frye, "Pretesting: Minimize time spent on skill work for intermediate readers," The Reading Teacher, Nov. 1988, pp. 100–104.

Richard Venezky and Luis Osin, "The Intelligent Design of Computer–Assisted Instruction," pp. 10–11, 30–49, 68–69, 136–145, 166–173, 262–265, Longman Publishing Group 1991.

Robert M. Gagne and Leslie J. Briggs, "Principles of Instructional Design," Ch. 12, pp. 217–220, and Ch. 14, pp. 261–285, Holt Rinehart and Winston, 1979.

Peter Warr, Michael Bird and Neil Rackham, "Evaluation of Management Training," pp. 53–57, Gower Press, 1970.

A. A. Lumsdaine, "Handbook of Research on Teaching, Chapter 12, Instruments and Media Instruction," pp. 583–682, Rand, McNally & Co. 1963

Unknown Author, "PLM Use Set—Defines and Routines," Control Data Corporation, 1983.

Tom Murray, Klaus Schultz, David Brown, John Clement, "An Analogy–Based Computer Tutor for Remediating Physics Misconceptions," Scienctific Reasoning Research Institute, Aug. 1988, pp. 1–7.

Rebecca Zwick, Dorothy T. Thayer, and Marilyn Wingersky, "DIF Analysis for Pretest Items In Computer–Adaptive Testing," Educational Testing Service, Apr. 25, 1994, pp. 1–43, 47–48, 51, 53–55.

Shirley T. Becnel, "A Design Model For Writing Computer Programs That Teach The Basic Skills to LD and SL Students," July 1984, pp. 1–38, U.S. Department of Education, National Institute of Education, Educational Resources Information Center (ERIC).

Donald Mc Isaac, Charles Bilow, George Macrides, and David Romstad, "An Overview of Micro–CMI," Wisconsin Research and Development Center for Individualized Schooling, The University of Wisconsin, Nov. 1980, pp. 1–19, U.S. Department of Education, National Institute of Education, Educational Resources Information Center (ERIC).

J. Richard Dennis, "Computer Managed Instruction and Individualization," The Illinois Series on Educational Application of Computers, pp. 1–31, Department of Secondary Education University of Illinois, 1979.

Unknown Author, Untitled, undated, pp. 29–44.

Jesse M. Heines, "The Use of Computer–Managed Instruction to Control On–Site, Self–Instructional Training in a Small Systems Customer Environment," Mar. 1978, pp. 1–12, U.S. Department of Education, National Institute of Education, Educational Resources Information Center (ERIC).

Unknown Author, Untitled, undated.

Unknown Author, "Development of an Interactive Videodisc Training System," Nov. 13, 1991, Omniplan Corp.

Unknown Author, "Industry Education Computer Based Training Strategy: Data Base Learning Model," Mar. 1988, Industry Education.

Unknown Author, "Computer Based Training Strategy," Feb. 1988, Arthur Andersen & Co.

Unknown Author, "On–Target Curriculum," undated, Nova-NET Learning, Inc.

Chris Flammang, "PLATO Teaches Cops," Illinois Police Officer, Spring 1979, vol. 10(1), pp. 103–117.

K. K. Tatsuoka and G. M. Chevalaz, "A Map Representation of Misconception in the Rule Space: Fraction Addition Arithmetic," Research Report 84–2–NIE, CERL, University of Illinois, Urbana, (Jan. 1984).

K. K. Tatsuoka, "Analysis of Errors in Fraction Addition and Subtraction Problems," Final Report for Grant #NIE–G–81–0002, CERL, University of Illinois, Urbana, (Jan. 1984).

M. Felty, Albert Liu, Ethan Edwards, John Gilpin, Dorothy Silver, and Martin Siegel, "Testing 1–2–3: Test Development and Delivery System," Computer–based Education Research Laboratory, University of Illinois, Urbana, IL. (May 1989).

Helen Kuznetsov, "A Human–Computer Interactive Design Program for Multisolution Nonlinear Problem, Advances in Engineering Software," Computational Mechanics Publications, 1988.

Helen Kuznetsov, "Decision Support Systems and Other Teaching and Evaluation Techniques for Efficient CBI," paper presented at the $2^{nd}$ annual conference of National Science Center for Communications and Electronics, August, Georgia, Apr. 1988.

Dr. Andrew R. Molnar, "Computers in Education: A Historical Perspective of the Unfinished Task," T.H.E. Journal, Nov. 1990, pp. 80–83.

Dorothy Z. Silver, "Instructor's Guide to the SYS IV Management System," Computer Based Education Research Laboratory (CERL) research report E–30, Mar. 1991, Third Edition, University of Illinois at Urbana–Champaign.

Robert C. Dixon and Elizabeth J. Clapp, "A Theory–Based Computer Tutorial Model," Computer Based Education Research Laboratory (CERL) research report E–26, May 1983, University of Illinois at Urbana–Champaign.

Dorothy Z. Silver, "Training Manual for the PCP SYS IV Computer–Based Management System," Computer Based Education Research Laboratory (CERL) research report E–30, Jan. 1985, University of Illinois at Urbana–Champaign.

Martin A. Siegel and Dennis M. Davis, "The PCP SYS IV Management System: Educational Overview," May 1983, University of Illinois at Urbana–Champaign, Computer Based Eduction Research Laboratory.

Jeri Carter, "The Interactive Courseware Developer's Guide," Oct. 1989, Star Mountain, Inc.

Unknown Author, "Old World Hebrew Learning System: Student Guide," Aprisa Multimedia, Inc., 1994.

Unknown Author, "Control Data Plato Author Language Reference Manual," Control Data Corporation, Publications and Graphics Division, Apr. 1978.

Dewey A. Slough, Burl D. Ellis, George F. Lahey, "Fixed Sequence and Multiple Branching Strategies In Computer Assisted Instruction," Sep. 1972, Naval Personnel and Training Research Laboratory Research Report SRR 73–6.

John D. Ford, Jr., and Dewey A. Slough, "Development and Evaluation of Computer Assisted Instruction For Navy Electronics Training: I. Alternating Currrent Fundamentals," May 1970, Naval Personnel and Training Research Laboratory Research Report SRR 70–32.

Ethan A. Edwards, "User's Guide to the Testing 1–2–3 Test Development Delivery System," Aug. 1990, Courseware & Curriculum Applications Computer–based Education Research Laboratory, University of Illinois at Urbana–Champaign.

Roy O. Walker, Michael T. Charles, Allen Avner, "Network Managed Computer Based Education," Mar. 18, 1993, The University of Illinois Champaign–Urbana.

Martin A. Siegel, "Instructor's Guide to The High School Mathematics Curricula—Advanced Algebra and Calculus," May 1991, University of Illinois Computer–Based Education Research Laboratory.

Martin A. Siegel, "Instructor's Guide to The CCA High School Social Science Curricula: U.S. Government, U.S. History, And Introductory Economics," Jun. 1990, University of Illinois Computer–Based Education Research Laboratory.

Martin A. Siegel, "Instructor's Guide to The CCA Basic Skills Mathematics Curriculum," Apr. 1990, University of Illinois Computer–Based Education Research Laboratory.

Martin A. Siegel, "Instructor's Guide to The CCA Basic Skills Spelling Curriculum," Apr. 1990, University of Illinois Computer–Based Education Research Laboratory.

Control Data Corporation, Plato CMI Author's Guide, 1978, Control Data Corp., St. Paul, MN.

Roger F. Paulson, Control Data Plato System Overview, 1976, Control Data Corp., St. Paul, MN.

Control Data Corporation, PLATO, undated (see attached D. Woolley Affidavit), Control Data Corp., Minneapolis, MN.

James L. L'Allier, Kurt W. Miles, and Sally H. Welsch, The NETg Mastery Test Strategy, Apr. 12, 1995, NETg Inc.

Verl E. Dennis and Dennis Grunner, Computer Managed Instruction at Arthur Andersen & Company: a status report, Education Technology, 1992, pp. 7–10, publisher unknown.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 28–45:

FIG. 3 illustrates in more detail the generation of the individualized learning track as illustrated in the step 122. Test items 1-1 . . . 1-N to be presented in the step 122 are prestored in one of the disk drive 24 or CD-Rom drive 26. In the step [122] *122a*, one of the test questions or exercises is selected and presented to the user on the display 20. The answer or response received via the input device 28 is compared to a previously stored answer and a step 122a *at a step 122b*. If the answer is unsatisfactory, the objective associated with the test item and the associated topic are retrieved in respective steps [122b, 122c] *122c, 122d*. At least the associated topic is then added to the individual learning profile in a step [122d] *122e*. If the answer is answered correctly in the step 122a, a determination is made in the step 122f if the testing sequence is finished. If it is not finished, the next test item selected. If the test sequence is finished, either (step 122g) the next text sequence 114b is entered or the user's performance is assessed in the step 124.

Column 5, line 9:

Preview a file using Quick View on the [sortcut] *shortcut* menu.

Column 5, lines 18–37:

FIG. 4 is a flow diagram illustrating in more detail executing the personal learning sequence, step 130. Where the personal learning sequence, created in the step 122d *122e*, includes a plurality of topics $T_1 \ldots T_N$, the system 10 presents each of the selected topics in a series of steps 130-1 . . . 130-N to the user via the display 20. The user can interact with the various presented topics via the keyboard or mouse 28 during the process of going through that particular individualized learning sequence. Subsequent to exiting the learning sequence, the system 10 can present a post-assessment test in a step 132 to determine the level of skill that the user has improved to as a result of the process. A similar set of steps can be carried out to implement the personal learning sequence for each of the units $U_2 \ldots U_N$.

AS A RESULT OF REEXAMINATION, IT HAS BEEN DETERMINED THAT:

Claims 1, 2, 3, 4, 5, 6 and 7 are cancelled.

\* \* \* \* \*